Figure 1:
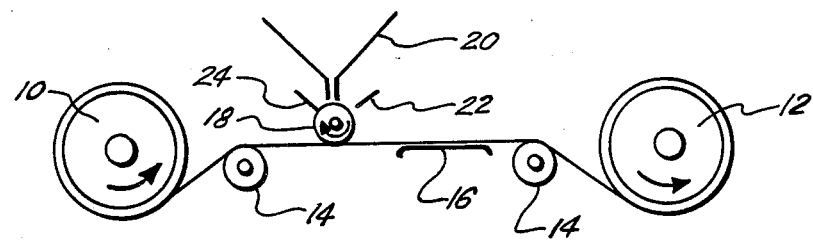

United States Patent [19]

Wright

[11] Patent Number: 4,913,759

[45] Date of Patent: Apr. 3, 1990

[54] POLYIMIDE PRECURSOR AND PSEUDO HOT-MELT PREPREGGING PROCESS EMPLOYING SAME

[75] Inventor: William E. Wright, Baton Rouge, La.

[73] Assignee: Ethyl Corporation, Richmond, Va.

[21] Appl. No.: 197,642

[22] Filed: May 23, 1988

Related U.S. Application Data

[63] Continuation-in-part of Ser. No. 37,537, Apr. 13, 1987, abandoned.

[51] Int. Cl.⁴ .............................................. B32B 31/00
[52] U.S. Cl. .................................... 156/238; 156/289; 156/330.9; 156/331.1; 428/473.5; 428/479.6; 524/104; 524/173; 524/233; 525/432; 528/353
[58] Field of Search .................. 156/238, 330.9, 331.1, 156/289; 524/104, 233, 173; 428/473.5, 479.6; 528/353; 525/432

[56] References Cited

U.S. PATENT DOCUMENTS

| | | |
|---|---|---|
| 3,511,807 | 5/1970 | Lovejoy .............................. 528/353 |
| 3,554,939 | 1/1971 | Lavin et al. . | |
| 3,654,227 | 4/1972 | Sine-Hart .......................... 428/473.5 |
| 4,111,906 | 9/1978 | Jones et al. ........................ 528/353 |
| 4,124,651 | 11/1978 | Lohmann et al. ................. 525/432 |
| 4,305,796 | 12/1981 | Gagliani et al. . | |
| 4,336,175 | 6/1982 | Gibby ................................. 528/353 |
| 4,535,101 | 8/1985 | Lee et al. . | |
| 4,690,999 | 9/1987 | Numata et al. .................... 528/353 |

FOREIGN PATENT DOCUMENTS

1373906 11/1974 United Kingdom ................ 156/238

*Primary Examiner*—John J. Gallagher
*Attorney, Agent, or Firm*—John F. Sieberth; Richard J. Hammond

[57] ABSTRACT

A polyimide precursor suitable for use in the pseudo hot-melt prepregging process is described. It consists essentially of a mixture of (a) about 40 to about 70 percent by weight of a substantially equimolar mixture of (i) 2,2-bis[4-(4-aminophenoxy)phenyl]hexafluoropropane or 2,2-bis[4-(3-aminophenoxy)phenyl]hexafluoropropane, or both, and (ii) lower alkyl diester of aromatic tetracarboxylic acid; (b) about 2 to about 50 percent by weight of polyamide (polyamic acid or ester) producible from components (i) and (ii); and (c) about 10 to about 50 percent by weight of solvent with the proviso that the mixture is a clear resinous solid at 25° C. and is a viscous, tacky, varnish-like liquid at a temperature falling in the range of 40° C. to 100° C. Also described are use of the polyimide precursors in preparing coated paper webs useful in preparing paper-backed prepregging tape, and use of the coated paper webs in preparing the paper-backed prepregging tapes.

21 Claims, 1 Drawing Sheet

U.S. Patent  Apr. 3, 1990  4,913,759

POLYIMIDE PRECURSOR AND PSEUDO HOT-MELT PREPREGGING PROCESS EMPLOYING SAME

REFERENCE TO RELATED APPLICATION

This is a continuation-in-part of prior copending application Ser. No. 37,537, filed Apr. 13, 1987, now abandoned.

TECHNICAL FIELD

This invention relates to polyimide precursors which are eminently suited for use in the pseudo hot-melt prepregging process and which result in polyimide composites of excellent high temperature performance.

BACKGROUND

The pseudo hot-melt prepregging process is a desirable way of producing reinforced polyimide laminates and shapes. In this process a very viscous hot solution of a curable polymeric precursor is spread onto rolls of release paper. After cooling to room temperature the coating becomes a flexible resinous solid. It is subsequently transferred to a continuous fibrous substrate by passing the coated web and the fibrous substrate through a bank of hot rolls to impregnate the coating onto the substrate. The product (often referred to as prepreg tape) is sold according to grade or areal weight of fiber which usually ranges from 50 to 300 grams per square meter and more typically 100 to 200 grams per square meter. The trend in such products is use of amounts of curable resin in the range of 25 to 50%, typically 30 to 35%. Tolerances in the product are critical and typically fall in the range of plus or minus 3 percent.

Polyimides made from 2,2-bis[(4-aminophenoxy)phenyl]hexafluoropropane ("4-BDAF") and their high temperature properties are well known. See for example U.S. Pat. Nos. 4,111,906, 4,203,922 and 4,477,648 and the paper by Peter Delvigs entitled "371° C. Mechanical Properties of Graphite/Polyimide Composites" prepared for the Second International Conference on Polyimides sponsored by the Society of Plastics Engineers, Inc., Ellenville, N.Y., Oct. 30–Nov. 1, 1985 (NASA Technical Memorandum 87122).

Difficulties are encountered when an attempt is made to form polyimide precursor solutions of 4-BDAF and tetracarboxylic acid derivatives (e.g., diesters of pyromellitic acid or 3,3',4,4'-benzophenonetetracarboxylic acid) for use in the pseudo hot-melt prepregging process. Although the solubility of these polyimide monomers in certain dipolar aprotic solvents at room temperature is quite high, even solutions in these solvents have too low a viscosity to be useful in the process. While the solubility of these monomers in the solvents can be increased to 60% or more by warming the solutions, the solutions deposit solids on cooling to room temperature and are consequently unsuited for prepregging using the pseudo hot-melt process.

THE INVENTION

Surprisingly, it has been found that a small amount of polyamic acid and/or ester solubilizes 4-BDAF and lower dialkyl esters of aromatic tetracarboxylic acids to such an extent as to make possible the production of "high solids" solutions of mixtures of these polyimide precursors in appropriate solvents. Moreover, the resultant polyimide precursor systems are well-suited for use in the pseudo hot-melt process.

In particular, this invention provides, inter alia, polyimide precursors that consist essentially of a mixture of (a) about 40 to about 70 percent by weight of a substantially equimolar mixture of (i) 2,2-bis[4-(4-aminophenoxy)phenyl]hexafluoropropane (4-BDAF) and/or 2,2-bis[4-(3-aminophenoxy)phenyl]hexafluoropropane (3-BDAF) and (ii) lower alkyl diester of one or more aromatic tetracarboxylic acids such as pyromellitic acid (PMA), 3,3',4,4'-benzophenonetetracarboxylic acid (BTA), 2,2-bis-(3,4-dicarboxyphenyl)hexafluoropropane (FDA), oxydiphthalic acid, biphenyltetracarboxylic acid, or other aromatic tetracarboxylic acids (particularly those free or substantially free of aliphatic hydrocarbon substituents); (b) about 2 to about 50 percent by weight of polyamide producible from components (i) and (ii); and (c) about 10 to about 50 percent by weight of a solvent; with the proviso that said precursor is a clear resinous solid at 25° C. and is a viscous, tacky, varnish-like liquid at a temperature falling in the range of 40° C. to 100° C. Such mixtures have softening temperatures somewhere between 25° C. and the temperature between 40° C. and 100° C. at which they become a viscous, tacky, varnish-like liquid. In addition, such mixtures will have a viscosity in the range of 2,000 to 12,000 centistokes at one or more temperatures in the range of 40° C. to 100° C. Preferably the sum of (a) and (b) is at least 70 percent by weight with the remaining 30 percent by weight or less consisting essentially of the solvent, (c).

For best results, the solvent of these compositions should contain from 10 to 100 percent by weight of one or more dipolar aprotic solvents, preferably N,N-dimethylformamide, N,N-dimethylacetamide, N-methylpyrrolidone, diglyme, dimethylsulfoxide, or the like. Other solvents which may be used include ethers such as tetrahydrofuran, tetrahydropyran, etc.; chlorohydrocarbons such as methylene dichloride, etc.; ketones such as acetone, methyl ethyl ketone, etc.; alcohols such as methanol, ethanol, propanol, isopropanol, etc.; and the like.

Component (b), the polyamide, preferably corresponds in makeup to a polyamide that is producible from the particular components (i) and (ii) present in the aforesaid substantially equimolar mixture. However, it will be understood and appreciated that the polyamide component of the polyimide precursors of this invention may be producible from a set of components (i) and (ii) that differ from those actually present in the precursor mixture. For example, if component (i) is 4-BDAF and component (ii) is a diester of PMA, component (b) is preferably a 4-BDAF-PMA polyamic acid (polyamide) although component (b) may instead be a 4-BDAFBTA polyamic acid, a 3-BDAF-FDA polyamic acid, or the like. Moreover, the polyamide need not actually be prepared from 3-BDAF or 4-BDAF and the diester of an aromatic tetracarboxylic acid since, as is well known in the art, such polyamic acids are most readily produced by reaction between 4-BDAF or 3-BDAF and the dianhydride of a given aromatic tetracarboxylic acid.

Preferred polyimide precursors of this invention have the following composition:

(1) 4-BDAF and/or 3-BDAF: 25–50 wt %
(2) Diester of aromatic tetracarboxylic acid: 25–40 wt %
(3) Polyamide: 2–20 wt %
(4) Solvent: 15–25 wt % provided of course that components (1) and (2) are present in substantially equimolar quantities, and the resultant precursor has the physical properties set forth above. In this connection, by "substantially equimolar quantities" is meant that the molar ratio of the components is in the range of 0.9 up to 1.1 and preferably in the range of 1.0 up to 1.1.

It will be appreciated of course that the polyamide component will generally be of relatively low molecular weight, e.g., its weight average molecular weight will often fall in the range of about 1500 to 5000.

Another embodiment of this invention is the provision of a paper web coated with a polyimide precursor of this invention. Such coated paper is readily prepared by applying to a web of release paper a flowable coating of a polyimide precursor of this invention heated to a temperature at which very little polyimide formation occurs (e.g. 40° to 100° C., usually around 80° to 85° C.), and then cooling the coating to produce a coating that remains solid at room temperature. In this operation, the coating is preferably applied to only one side of the paper web and for this purpose roll coaters or other standard coating apparatus may be used.

Still another embodiment of this invention involves the use of the polyimide precursors of this invention in the production of prepreg tape or the like. In accordance with this embodiment, a continuous fibrous substrate (e.g., carbon fibers, glass fibers, etc. whether aligned unidirectionally or woven) is impregnated with a polyimide precursor of the type described hereinabove. Most preferably, this is accomplished by passing a web of sized release paper one side of which is coated with a polyimide precursor of this invention and the fibrous substrate through a bank of hot rolls so that the heat-softened coating comes in contact with the fibrous substrate and is transferred thereto and impregnated thereon. Thereupon, the impregnated substrate is cooled so that the polyimide precursor is solidified. In this operation, as in the operation in which the coated release paper itself is produced, the temperature of the heating is controlled so that polyimide formation is kept to a minimum. Preferably a web of uncoated sized release paper is passed through the bank of hot rolls on the opposite side of the substrate to prevent the transferred coating from adhering to the rolls on that side of the substrate. After the coating has solidified on the substrate, this web of release paper is separated from the impregnated substrate and discarded.

To prepare the polyimide precursors of this invention several different procedures may be used. A particularly desirable procedure, especially when conducting the process on the laboratory scale, is to form an essentially equimolar mixture of (a) 4-BDAF (2,2-bis[4-(4-aminophenoxy)phenyl]hexafluoropropane) and/or 3-BDAF (2,2-bis[4-(3-aminophenoxy)phenyl]hexafluoropropane) and (b) lower alkyl diester of an aromatic tetracarboxylic acid such as PMA, BTA, FDA, etc., or any mixture of lower alkyl diesters of two or more tetracarboxylic acids in an excess quantity of the solvent, preferably a solvent containing at least 10% by weight of a dipolar aprotic solvent, and subject the mixture to vacuum stripping using a rotary evaporator at 70° to 100° C. and a few mm of pressure. On a larger scale it may be possible to use a wiped wall evaporator under these temperatures and reduced pressure conditions. Another procedure is to preform the polyamide by reaction at low temperature (e.g., zero to 90° C.) between equimolar amounts of (a) 4-BDAF and/or 3-BDAF and (b) an aromatic dianhydride such as pyromellitic acid dianhydride, 3,3',4,4'-benzophenonetetracarboxylic acid dianhydride, 2,2-bis(3,4-dicarboxyphenyl)hexafluoropropane dianhydride, oxydiphthalic acid dianhydride, biphenyltetracarboxylic acid dianhydride, or any mixture of such materials. Thereupon, suitable quantities of this polyamide (also known as polyamic acid or ester) are blended with the other components in the requisite quantities to form the precursor of this invention. In any such procedure care should be taken to avoid exposure of the reactants to excessive heat as this could result in premature polyimide formation, which is undesirable. Another particularly convenient procedure is to form the polyamide in situ by forming a mixture of (a) 4-BDAF and/or 3-BDAF, (b) diester-diacid of PMA, BTA, and/or FDA, or other aromatic tetracarboxylic acid (or mixture of such materials), and (c) solvent, which mixture contains from about 2 to 20 molar excess 4-BDAF and/or 3-BDAF relative to the diesterdiacid(s) present and to this adding an amount of an aromatic anhydride substantially equivalent to the amount of excess 4-BDAF and/or 3-BDAF present. This anhydride reacts with the excess quantity of 4-BDAF and/or 3-BDAF to form polyamide in situ and leaves the substantially equimolar quantities of the 4-BDAF and/or 3-BDAF and diester-diacid unreacted.

As noted above, the precursor, however prepared, should possess the requisite physical properties, viz., it should be a clear resinous solid at 25° C., and it should be a viscous, tacky, varnish-like liquid at a temperature falling in the range of 40° C. to 100° C. At one or more temperatures within the range of 40° C. to 100° C. the mixture will have a viscosity falling in the range of 2,000 to 12,000 centistokes.

The diesters used in the practice of this invention may be represented by the general formula

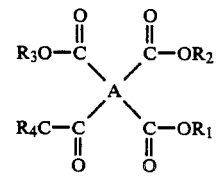

wherein A is a tetravalent aromatic group and $R_1$ to $R_4$ are hydrogen or lower alkyl with two of them (usually one of $R_1$ and $R_2$ and one of $R_3$ and $R_4$) being hydrogen and the other two being lower alkyl. The tetravalent aromatic group (A) is preferably one having one of the following structures:

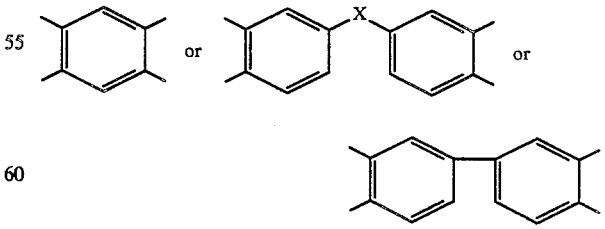

wherein X is one or more of the following:

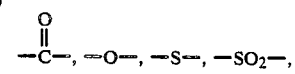

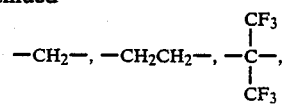

The following diesters are preferably used in the practice of this invention:
dimethyl ester of 1,2,4,5-benzenetetracarboxylic acid, (also known as dimethyl ester of pyromellitic acid)
diethyl ester of 1,2,4,5-benzenetetracarboxylic acid
diisopropyl ester of 1,2,4,5-benzenetetracarboxylic acid
methyl ethyl ester of 1,2,4,5-benzenetetracarboxylic acid
methyl isopropyl ester of 1,2,4,5-benzenetetracarboxylic acid
dimethyl ester of 3,3',4,4'-benzophenonetetracarboxylic acid
diethyl ester of 3,3',4,4'-benzophenonetetracarboxylic acid
diisopropyl ester of 3,3',4,4'-benzophenonetetracarboxylic acid
methyl ethyl ester of 3,3',4,4'-benzophenonetetracarboxylic acid
methyl isopropyl ester of 3,3',4,4'-benzophenonetetracarboxylic acid
dimethyl ester of 2,2-bis(3,4-dicarboxyphenyl)hexafluoropropane
diethyl ester of 2,2-bis(3,4-dicarboxyphenyl)hexafluoropropane
diisopropyl ester of 2,2-bis(3,4-dicarboxyphenyl)hexafluoropropane
methyl ethyl ester of 2,2-bis(3,4-dicarboxyphenyl)hexafluoropropane
methyl isopropyl ester of 2,2-bis(3,4-dicarboxyphenyl)hexafluoropropane
dimethyl ester of oxydiphthalic acid
diethyl ester of oxydiphthalic acid
diisopropyl ester of oxydiphthalic acid
dimethyl ester of biphenyl-3,3',4,4'-tetracarboxylic acid
diethyl ester of biphenyl-3,3',4,4'-tetracarboxylic acid
diisopropyl ester of biphenyl-3,3',4,4'-tetracarboxylic acid Other diesters which may be used include:
dipropyl ester of 1,2,4,5-benzenetetracarboxylic acid
di-tert-butyl ester of 1,2,4,5-benzenetetracarboxylic acid
di-sec-butyl ester of 1,2,4,5-benzenetetracarboxylic acid
methyl propyl ester of 1,2,4,5-benzenetetracarboxylic acid
methyl tert-butyl ester of 1,2,4,5-benzenetetracarboxylic acid
dipropyl ester of 3,3',4,4'-benzophenonetetracarboxylic acid
di-tert-butyl ester of 3,3',4,4'-benzophenonetetracarboxylic acid
di-sec-butyl ester of 3,3',4,4'-benzophenonetetracarboxylic acid
methyl propyl ester of 3,3',4,4'-benzophenonetetracarboxylic acid
methyl sec-butyl ester of 3,3',4,4'-benzophenonetetracarboxylic acid
dipropyl ester of 2,2-bis(3,4-dicarboxyphenyl)hexafluoropropane
di-tert-butyl ester of 2,2-bis(3,4-dicarboxyphenyl)hexafluoropropane
di-sec-butyl ester of 2,2-bis(3,4-dicarboxyphenyl)hexafluoropropane
dipropyl ester of oxydiphthalic acid
di-sec-butyl ester of biphenyl-3,3',4,4'-tetracarboxylic acid The following examples illustrate the production of various precursors of this invention using the vacuum stripping procedure. The general procedure used was as follows: Pyromellitic dianhydride (PMDA) or benzophenonetetracarboxylic dianhydride (BTDA) is heated for 2 to 3 hours with a low boiling alcohol (e.g., ethyl alcohol, EtOH) in a dipolar aprotic solvent such as N-methyl pyrrolidone (NMP), N,N-dimethylformamide (DMF), or N,N-dimethylacetamide (DMAc) at 60°–90° C. until reaction is complete (1 to 3 hours). Two moles of alcohol react per mole of anhydride and a solution containing an equimolar mixture of two isomeric diesters forms. Small amounts of monoester triacid and sometimes small amounts of monoester monoanhydride are present as by-products. An equimolar quantity of 2,2-bis[4-(4-aminophenoxy)phenyl]hexafluoropropane (4-BDAF) is dissolved in the diester solution to give a dark clear amber liquid containing about 60% non-volatile solids (NVS). This free flowing liquid (typically 100–600 cst at 25° C.) is then heated on a rotary evaporator under vacuum at 70° to 95° C. for about 2 hours to remove solvent and increase the NVS to about 80 weight percent. The product is a very viscous liquid at 60° to 80° C. that sets to a dark clear resinous solid at room temperature. In addition to monomers (diester+4-BDAF) it contains small quantities of low molecular weight polyamic esters and acids.

Experimental conditions and results are summarized in the ensuing Table.

TABLE I:

| PREPARATION OF PREPREGGING SOLUTIONS | | | | | |
|---|---|---|---|---|---|
| Example No. | 1 | 2 | 3 | 4 | 5 |
| A. DIESTER PREPARATION | | | | | |
| Anhydride | | | | | |
| Type | PMDA | PMDA | PMDA | PMDA | PMDA |
| g | 218 | 218 | 240 | 240 | 262 |
| Mole | 1.0 | 1.0 | 1.10 | 1.10 | 1.20 |
| Alcohol | | | | | |
| Type | EtOH | IPA | IPA | EtOH | MeOH |
| g | 93 | 120 | 132 | 102 | 79 |
| Mole | 2.02 | 2.0 | 2.2 | 2.21 | 2.64 |
| Solvent | | | | | |
| Wt.& Type | 550 g NMP | 550 g NMP | 600 g DMF | 600 g DMF | 600 g DMF |
| Conditions | | | | | |
| Temp °C. | 60–70 | 60 | 60 | 60–65 | 65 |
| Time Hr | 2.5 | 2.0 | 2.5 | 2 | 5 |
| B. DIESTER 4-BDAF | | | | | |
| Mole Diester | 0.98 | 0.99 | 1.09 | 0.77 | 1.19 |
| Mole 4-BDAF | 0.98 | 0.99 | 1.09 | 0.77 | 1.19 |
| Solvent | 278 g NMP | 0 | 0 | 0 | 350 |
| Solids wt % | 50 | 61 | 60 | 60 | 50 |
| C. STRIP | | | | | |
| Temp °C. | 70–90 | 75–95 | 80–90 | 75–80 | 80–95 |
| Time Hr | 3 | 2.5 | 2 | 2 | 3 |
| Press mm Hg | 15 | 10 | 2 | | |
| Water Mole | 0.33 | 0.32 | 0.33 | 0.14 | 0.42 |
| Alcohol Mole | 0.10 | 0.14 | 0 | 0.03 | .25 |
| Amidization Route | | | | | |
| Via COOH % | 11 | 9 | 3 | 15 | |
| Via COOR % | 5 | 7 | 0 | 2 | 15 |
| % Solids wt % | 79 | 81 | 83 | 82 | 74 |

Example

TABLE I:-continued

| No. | 6 | 7 | 8 | 9 | 10 |
|---|---|---|---|---|---|
| A. DIESTER PREPARATION | | | | | |
| Anhydride | | | | | |
| Type | PMDA | BTDA | BTDA | BTDA | PMDA |
| g | 218 | 322 | 322 | 322 | 218 |
| Mole | 1.0 | 1.0 | 1.0 | 1.0 | 1.0 |
| Alcohol | | | | | |
| Type | EtOH | EtOH | IPA | MeOH | EtOH |
| g | 93 | 101 | 132 | 70 | 101 |
| Mole | 2.02 | 2.2 | 2.2 | 2.2 | 2.2 |
| Solvent | | | | | |
| Wt.& Type | 550 g DMAc | 600 g NMP | 600 g NMP | 600 g NMP | 500 g NMP |
| Conditions | | | | | |
| Temp °C. | 60-70 | 60-75 | 70-84 | 60-75 | 65-70 |
| Time Hr | 2.4 | 5 | 4.5 | 2 | 2 |
| B. DIESTER 4-BDAF | | | | | |
| Mole Diester | 0.98 | 0.99 | 0.99 | 0.99 | 0.99 |
| Mole 4-BDAF | 0.98 | 0.99 | 0.99 | 0.99 | 0.99 |
| Solvent | 0 | 227 | 0 | 0 | 0 |
| Solids wt % | 60 | 50 | 66 | 60 | 61 |
| C. STRIP | | | | | |
| Temp °C. | 70-95 | 80-95 | 80-95 | 80-95 | 90-95 |
| Time Hr | 3 | 2.8 | 2 | 2 | 2.5 |
| Press mm Hg | 2-10 | 1-5 | 1-5 | 2-5 | 2-5 |
| Water Mole | — | 0.58 | 0.66 | 0.76 | 0.28 |
| Alcohol Mole | — | 0.00 | 0.05 | 0.13 | 0.35 |
| Amidization Route | | | | | |
| Via COOH % | — | 30 | 28 | 36 | 17 |
| Via COOR % | — | 0 | 3 | 7 | 25 |
| % Solids wt % | 83 | 73 | 84 | 77 | 84 |

Each of the freshly prepared precursors of Examples 1-10 was found to have the requisite physical properties for use in preparing prepregs. In particular, fiberglass cloth was impregnated with the freshly prepared respective precursors at 60° to 80° C. and the impregnated cloth was found to have the necessary tack and drape for prepregging.

EXAMPLE 11

Preparation of Polyimide Precursor Solution and Prepreg

A two liter round bottomed flask was fitted with mechanical stirrer, reflux condenser, nitrogen inlet and thermometer. Two hundred fifty grams (250 g) of NMP were charged to the flask followed by 218 g (1.0 mole) of PMDA. To the thick slurry that formed, 64 g (2.0 moles) of dry methyl alcohol (0.03% $H_2O$) were added. A vigorous reaction set in driving the temperature of the reaction mass from 29° C. to 77° C. (momentarily to 83° C.). A clear straw-colored liquid resulted which was heated at about 70° C. for 7 hours. NMR analysis showed that the mixture had the following composition:

52 wt % PMDE (2 isomeric diesters)
1 wt % PMME (monoester triacid)
47 wt % NMP

On cooling to 25° C., the product solidified and 50 g more of NMP were added and the mixture warmed to 60° to 65° when it again became liquid. Five hundred fifteen grams (515 g) (0.99 mole) of 4-BDAF were gradually stirred into the PMDE solution to give a very viscous amber solution.

To 550 g of the latter were added 51.8 g (0.1 mole) 4-BDAF and 21.8 g (0.10 mole) PMDA. The mixture was stirred at about 60° C. for 2½ hours to yield a very viscous amber solution which set to a tacky, resinous semi-solid on cooling. Gel permeation chromatography, NMR and infra red spectroscopy showed that this polyimide precursor solution contained a substantial amount of polyamic acid in addition to the PMDE and 4-BDAF monomers.

The usefulness of the precursor solution in hot-melt processing was demonstrated as follows:

Several ounces of the molten precursor solution were spread into a film on strips of release paper at about 60° to 70° C. On cooling the resinous film remained supple and the coated paper could be bent sharply without breaking the coating. Consequently, it could be easily stored in this form by rolling the coated paper into conveniently sized rolls as is the practice in pseudo hot-melt processing.

A piece of woven carbon fiber cloth was placed on top of a piece of the coated paper and then covered with another piece of release paper. The sandwich-like product was warmed to 60° to 70° C. on a hot plate and pressure applied to help the melted coating to flow for a few seconds. On cooling, the paper was peeled from the now fully impregnated carbon fiber cloth. Virtually all of the coating had been transferred from the paper to the cloth—another requirement in the hot melt process.

The resulting carbon fiber prepreg had good tack and drape and was stored on paper backing. Ongoing storage tests at 0° C. and 25° C. have shown that the prepreg has retained its tack and drape for two weeks with little or no change in its chemical composition. This demonstrates that the prepreg compositions have adequate stability for handling under normal operating conditions. However, when a portion of the prepreg was kept at 50°-60° C. overnight, it hardened and lost its tack—emphasizing the need for proper storage of the product.

EXAMPLE 12

Using the same apparatus and procedure as in Example 11, another precursor solution and prepreg composition were prepared to demonstrate that small variations in the diamine/diester molar ratio are allowable without any adverse effect on prepreg properties.

Four hundred thirty-six grams (436 g) (2.0 moles) PMDA were added to 600 g NMP with stirring to form a thick slurry. One hundred thirty-two grams (132 g) (4.1 moles) of dry methyl alcohol were added over 20 minutes to yield a clear solution. The addition caused a strong exotherm that drove the temperature of the reaction mass from 34° C. to 72° C. After stirring at about 65° C. for 1 hour, analysis of the reaction mass indicated that the solution contained about 39% of a mixture of equal amounts of two isomeric diester diacids of PMDA.

To 233 g (0.4 mole) of this PMDE solution were added 197 g (0.38 mole) of 4-BDAF. The molar ratio of PMDE:4-BDAF was 1.05:1. After stirring for 2½ hours at 50°-65° C., a viscous amber solution resulted. Analysis showed that in addition to the PMDE and 4-BDAF, a small but significant amount of polyamide had formed during the heating period. In this case no further addition of polyamide was made.

A prepreg was made by the procedure described in the Example 11. Although it was somewhat tackier than the prepreg of Example 11, it possessed the same desirable properties.

EXAMPLE 13

A 500 mL round bottom flask fitted with mechanical stirrer, thermometer, nitrogen inlet and reflux condenser was charged with the following components:

(a) 109.0 g (0.20 mole) of a 51 weight percent solution of the dimethyl ester of PMDA in N-methyl pyrrolidone (NMP)

(b) 198 g (0.19 mole) of a 50 weight percent solution of 4-BDAF in tetrahydrofuran (THF).

The resulting clear solution was refluxed (72° C. to 78° C.) for 3.5 hours and analyses were made periodically which showed that polyamide formed progressively during this reflux period.

Most of the THF was removed from the product by distillation at a pot temperature of about 64° C. and increasing vacuum to a final pressure of about 5 mm Hg.

The resultant clear, viscous solution (that still contained a few percent of residual THF), set to a resinous semi-solid on cooling to room temperature.

It readily impregnated carbon fiber cloth to give a prepreg with good tack and drape.

Figure 2:
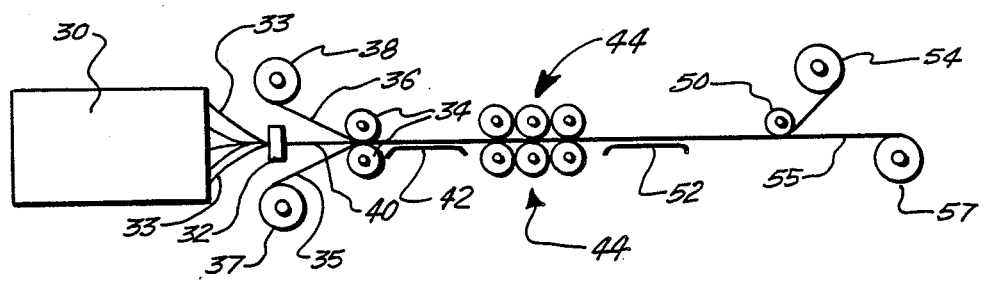

In the Drawing:

FIG. 1 illustrates a method for applying a coating of polyimide precursor to a paper web; and FIG. 2 illustrates a method for impregnating a continuous fibrous substrate with polyimide precursor.

Referring to FIG. 1, a typical paper coater system that may be used in preparing coated papers of this invention comprises paper feed roll 10, coated paper takeup roll 12, and tensioning rolls 14,14 and cold platen 16 over which the paper web is passed. Positioned above the tensioned paper web is a heated coating transfer roll 18 which receives the coating resin (i.e., a polyimide precursor of this invention) from hopper 20. Roll 18 keeps the resin in a molten condition and the molten coating adhering thereto is transferred to the paper web, the thickness of the coating being regulated by knife 22 which keeps a puddle of molten resin on the upper portion of roll 18 between knife 22 and fence 24. Thus by controlling the rate of resin feed from hopper 20 to roll 18, the rate at which the paper web is transferred from roll 10 to roll 12, the temperature of roll 18 and the gap between knife 22 and roll 18, a smooth even coating of the molten resin is applied to the paper web. As the coated web passes over platen 16 the coating is solidified. Since the coating is flexible and nontacky after such cooling, the coated paper web is readily taken up on roll 12. Often a layer of thin polyolefin film (e.g., polyethylene film) (not shown) is superposed upon the coated paper web before it is taken up on roll 12 so that the polyolefin film separates successive layers of the coated paper web in the roll. In the system depicted, roll 18 is rotated counter-currently to the movement of the paper web, and this is the preferred arrangement. However, it is possible to rotate roll 18 in the opposite direction provided the positions of knife 22 and fence 24 are reversed. Platen 16 may utilize cooling water and provide any suitable cooling temperature, such as for example, 7° to 10° C. Hopper 20 may contain heating means to premelt the resin before it is transferred to roll 18.

In the system of FIG. 2, a plurality of fibers 33 are drawn from creel 30 and through comb 32 which closely aligns them in parallel. In a typical installation creel 30 may contain, say, 100 to 500 bobbins of fiber. The resultant fibrous substrate 40 is passed between rolls 34,34 between a paper web 35 coated with a polyimide precursor of this invention (from supply roll 37) and an uncoated paper web 36 (from supply roll 38). The coating is of course on the side of web 35 confronting substrate 40. The sandwich structure leaving rolls 34,34 is passed over heater 42 and thence between a bank of hot rolls 44 whereby the substrate 40 is impregnated with resinous coating from web 35. The sandwich structure is then passed over platen 52 to cause the softened resinous polyimide precursor to solidify. Thereupon, web 36 is drawn off by roll 50 and spool 54. The cooled paper-backed prepreg 55 is taken up on spool 57. In instances where a polyolefin film has been superposed on the coated paper web in order to separate successive layers of the coated paper web from each other, the polyolefin film is separated from the coated paper web by means of a take-up roll (not shown) prior to introducing the coated paper web into the nip of rolls 34,34.

In the form shown in FIG. 2, the apparatus is adapted for use in production of a unidirectional prepreg according to this invention. It will of course be appreciated that a woven fibrous substrate may be used as a substrate 40 in lieu of aligned fibers. It will also be appreciated that the webs 35 and 36 may be reversed so that the coated web is above and the uncoated web is below substrate 40, again with the coating confronting the substrate. It is also possible to use two rolls of coated paper web, one above and one below substrate 40. In all cases, the paper web should be sized with a suitable releasing agent so that it can be readily separated from the adjacent fibrous substrate.

It will be understood and appreciated that other systems may be used for producing the coated paper webs and prepregs of this invention, the arrangements given in FIGS. 1 and 2 being merely typical systems that may be employed for these purposes.

EXAMPLE 14

To a ten-gallon jacketed reaction vessel equipped with stirring means, a nitrogen inlet and a thermocouple were charged N-methylpyrrolidone (6.35 kg), benzophenonetetracarboxylic acid dianhydride (7.16 kg), and methanol (1.66 kg). The vessel was heated with stirring to 70° to 80° C. for about two hours. Upon completion of this esterification reaction, the reaction solution contained 50.4% of benzophenonetetracarboxylic acid dimethyl ester, 5.4% of benzophenonetetracarboxylic acid monoethyl ester, 42.5% of N-methylpyrrolidone, and 1.7% of methanol. To this ester solution was added 23.03 kg of a 50% solution of 4-BDAF in tetrahydrofuran solvent. The reactor was sealed and the reaction mass heated to 75° C. and maintained in the range of 75° to 82° C. for about 3¼ hours. The vessel was vented and tetrahydrofuran solvent was vented to a cool receiver at atmospheric pressure. Then a vacuum was slowly applied to complete the removal of the tetrahydrofuran. Finally, at a pressure of 23 millimeters of mercury and 74° C., distillation ceased. The product was collected through the lower valve assembly of the vessel to yield 19.63 kg of a very viscous liquid. Analysis of this product by proton NMR showed the following composition: 16.6% benzophenonetetracarboxylic acid dimethyl ester, 32.9% 4-BDAF, 22.6% benzophenonetetracarboxylic acid-4-BDAF polyamide, 27.6% N-methylpyrrolidone, 0.1% methanol, 0.2% tetrahydrofuran.

This product set to a clear amber resinous solid when cooled to room temperature. At 85° C. its kinematic viscosity was 4,600 centistokes.

This product was applied to a paper web 12 inches in width using the general procedure described above with reference to FIG. 1. In this operation a thin layer of polyethylene film was employed to separate successive layers of the coated paper web. A total of 305 yards of paper web coated with the polyimide precursor was produced in this operation.

Using the general impregnation procedure described above with reference to FIG. 2, seven rolls of unidirectional prepreg tape were formed using 134 strands of closely aligned parallel carbon fibers (HYTEX 50-8B, 6K). The resultant prepreg had a polyimide precursor resin content of approximately 48 weight percent. The prepreg was examined and found to have the necessary tack and drape for subsequent lay-up and composite manufacture.

This invention is susceptible to considerable variation in its practice within the spirit and scope of the ensuing claims.

What is claimed is:

1. A high solids polyimide precursor solution consisting essentially of a resinous mixture of:
   (a) about (i) 25–50 weight percent of 2,2-bis[4-(4-aminophenoxy)phenyl]hexafluoropropane or 2,2-bis[4-(3-aminophenoxy)phenyl]hexafluoropropane, or both, and (ii) 25–40 weight percent of a lower alkyl diester of at least one aromatic tetracarboxylic acid;
   (b) about 2 to about 20 percent by weight of polyamide having a weight average molecular weight of about 1500 to 5000 produced by reaction between (i) 2,2-bis[4-(3-aminophenoxy)phenyl]hexafluoropropane or 2,2-bis[4-(3-aminophenoxy)phenyl]hexafluoropropane, or both, and (ii) a diester of a dianhydride of an aromatic tetracarboxylic acid; and
   (c) about 15 to about 25 percent by weight of solvent from 10 to 100 percent by weight of which is one or more dipolar aprotic solvent;
   said solution being a clear resinous solid at 25° C., that is a viscous tacky, varnish-like liquid at a temperature in the range of 40° to 100° C. suitable for use in a pseudo hot-melt prepregging process.

2. A composition according to claim 1 wherein component (i) is 2,2-bis[4-(4-aminophenoxy)phenyl]hexafluoropropane.

3. A composition according to claim 1 wherein component (ii) is predominantly a lower alkyl diester of one or more of the following acids:
   pyromellitic acid
   3,3',4,4'-benzophenonetetracarboxylic acid
   2,2-bis-(3,4-dicarboxyphenyl)hexafluoropropane
   oxydiphthalic acid
   biphenyltetracarboxylic acid 4. A composition according to claim 1 wherein component (ii) is predominantly lower alkyl diester of pyromellitic acid and wherein said polyamide is a pyromellitic acid-2,2-bis[4-(4-aminophenoxy)phenyl]hexafluoropropane polyamide.

5. A composition according to claim 1 wherein component (ii) is predominantly lower alkyl diester of 3,3',4,4'-benzophenonetetracarboxylic acid and wherein said polyamide is a 3,3',4,4'-benzophenonetetracarboxylic acid-2,2-bis[4-(4-aminophenoxy)phenyl]hexafluoropropane polyamide.

6. A composition according to claim 1 wherein the solvent consists essentially of N-methylpyrrolidone, N,N-dimethylformamide or N,N-dimethylacetamide or any mixture of any two or all three of them.

7. A composition according to claim 1 wherein component (ii) is predominantly a methyl or ethyl diester of pyromellitic acid and wherein said polyamide is a pyromellitic acid-2,2-bis[4-(4-aminophenoxy)phenyl]hexafluoropropane polyamide and wherein the dipolar aprotic solvent is N-methylpyrrolidone.

8. A composition according to claim 1 wherein component (ii) is predominantly a methyl or ethyl diester of 3,3',4,4'-benzophenonetetracarboxylic acid and wherein said polyamide is a 3,3',4,4'-benzophenonetetracarboxylic acid-2,2-bis[4-(4-aminophenoxy)phenyl]hexafluoropropane polyamide and wherein the dipolar aprotic solvent is N-methylpyrrolidone.

9. A composition according to claim 1 wherein component (ii) is predominantly a methyl or ethyl diester of pyromellitic acid and wherein said polyamide is a pyromellitic acid-2,2-bis[4-(4-aminophenoxy)phenyl]hexafluoropropane polyamide and wherein the dipolar aprotic solvent is N,N-dimethylformamide.

10. A composition according to claim 1 wherein component (ii) is predominantly a methyl or ethyl diester of 3,3',4,4'-benzophenonetetracarboxylic acid and wherein said polyamide is a 3,3',4,4'-benzophenonetetracarboxylic acid-2,2-bis[4-(4-aminophenoxy)phenyl]hexafluoropropane polyamide and wherein the dipolar aprotic solvent is N,N-dimethylformamide.

11. A composition according to claim 1 wherein component (ii) is predominantly a methyl or ethyl diester of pyromellitic acid and wherein said polyamide is a pyromellitic acid-2,2-bis[4-(4-aminophenoxy)phenyl]hexafluoropropane polyamide and wherein the dipolar aprotic solvent is N,N-dimethylacetamide.

12. A composition according to claim 1 wherein component (ii) is predominantly a methyl or ethyl diester of 3,3',4,4'-benzophenonetetracarboxylic acid and wherein said polyamide is a 3,3',4,4'-benzophenonetetracarboxylic acid-2,2-bis[4-(4-aminophenoxy)phenyl]hexafluoropropane polyamide and wherein the dipolar aprotic solvent is N-N,dimethylacetamide.

13. A paper web coated with a composition of claim 1.

14. A web of release paper having a dry coating thereon of a composition of claim 1.

15. A method for preparing a coated paper web suitable for use in impregnating a continuous fiber substrate, which method comprises applying to a web of release paper a flowable coating of a composition of claim 1 heated to a temperature below the temperature at which appreciable polyimide formation occurs, and then cooling the coating to produce a coating that remains solid at room temperature.

16. In the pseudo hot melt process for preparing paperbacked prepreg wherein a continuous fibrous substrate is passed in contact with a coated paper web into a bank of hot rolls to apply the coating to the substrate and thereby form a paper-backed prepreg, the improvement wherein the coating on said paper web is a polyimide precursor of claim 1 and wherein the temperature of at least some of the hot rolls is controlled to a temperature above the softening temperature of said precursor but below the temperature at which appreciable polyimide formation occurs.

17. A process according to claim 16 wherein said coated paper web is a sized release paper coated on but one side, wherein another web of sized release paper is passed into said bank of hot rolls on the side of the substrate opposite to the side confronted by the coating on the sized release paper, and wherein the substrate is composed of carbon fibers.

18. A process according to claim 16 the substrate is composed of unidirectionally aligned continuous unwoven fibers.

19. A process according to claim 16 wherein the substrate is composed of a continuous fabric composed of woven fibers.

20. A paper-backed prepreg prepared by the process of claim 16.

21. The paper-backed prepreg of claim 20 wherein the substrate is composed of carbon fibers.

* * * * *

UNITED STATES PATENT AND TRADEMARK OFFICE
CERTIFICATE OF CORRECTION

PATENT NO.   : 4,913,759

DATED        : April 3, 1990

INVENTOR(S)  : William E. Wright

It is certified that error appears in the above-identified patent and that said Letters Patent is hereby corrected as shown below:

Face of Patent, References Cited, reads "Sine-Hart" and should read -- Dine-Hart --.

Face of Patent, References Cited, reads "Gibby" and should read -- Gibbs --.

Face of Patent, References Cited, three references omitted, 3,190,856, 3,347,808, Lavin, et al and 3,554,935, Knapp, et al.

Column 11, line 26 reads "2,2-bis[4-(3-aminophenoxy)phenyl]hexafluoropropane" and should read -- 2,2-bis[4-(4-aminophenoxy)phenyl]hexafluoropropane.

Signed and Sealed this

Twentieth Day of August, 1991

Attest:

HARRY F. MANBECK, JR.

*Attesting Officer*  *Commissioner of Patents and Trademarks*